United States Patent
Klapp et al.

(10) Patent No.: US 9,016,341 B2
(45) Date of Patent: Apr. 28, 2015

(54) BICYCLE TIRE WITH REINFORCEMENT LAYER

(75) Inventors: Wolfgang Klapp, Korbach (DE); Wolfgang Bende, Allendorf (DE)

(73) Assignee: Continental Reifen Deutschland GmbH, Hannover (DE)

( * ) Notice: Subject to any disclaimer, the term of this patent is extended or adjusted under 35 U.S.C. 154(b) by 816 days.

(21) Appl. No.: 12/829,865

(22) Filed: Jul. 2, 2010

(65) Prior Publication Data

US 2011/0083781 A1 Apr. 14, 2011

Related U.S. Application Data

(63) Continuation of application No. 10/576,601, filed as application No. PCT/EP2004/052301 on Sep. 24, 2004, now abandoned.

(30) Foreign Application Priority Data

Oct. 24, 2003 (DE) .................. 10 349 794

(51) Int. Cl.
*B60C 9/18* (2006.01)
*D02G 3/48* (2006.01)
*B60C 9/00* (2006.01)
*B60C 9/20* (2006.01)
*B60C 19/12* (2006.01)

(52) U.S. Cl.
CPC .............. *B60C 9/0042* (2013.04); *B60C 9/20* (2013.01); *B60C 19/12* (2013.01); *Y10T 152/1081* (2015.01)

(58) Field of Classification Search
None
See application file for complete search history.

(56) References Cited

U.S. PATENT DOCUMENTS

| | | | |
|---|---|---|---|
| 3,837,982 A * | 9/1974 | Paola, S. | |
| 4,196,763 A | 4/1980 | Imamura | |
| 4,249,587 A | 2/1981 | Duttlinger | |
| 4,649,979 A | 3/1987 | Kazusa et al. | |
| 5,427,165 A | 6/1995 | Balestra et al. | |
| 5,565,264 A | 10/1996 | Howland | |
| 5,785,779 A | 7/1998 | McGee et al. | |
| 5,837,623 A | 11/1998 | Howland | |
| 5,976,996 A | 11/1999 | Howland | |
| 6,266,818 B1 | 7/2001 | Howland et al. | |
| 6,568,446 B1 | 5/2003 | Schulte | |
| 2002/0074068 A1 | 6/2002 | Howland et al. | |

(Continued)

FOREIGN PATENT DOCUMENTS

| | | |
|---|---|---|
| DE | 2905136 | 8/1980 |
| DE | 7717997 | 6/1983 |

(Continued)

OTHER PUBLICATIONS

Vectran—Grasp the World of Tomorrow, Engineering Data, 1999.

(Continued)

*Primary Examiner* — Justin Fischer
(74) *Attorney, Agent, or Firm* — Greenblum & Bernstein, P.L.C.

(57) ABSTRACT

Bicycle tires with at least one reinforcement layer that contains strength supports and that is arranged between carcass and tread rubber and/or between carcass layers below the tread rubber and/or within the tread rubber. For a high resistance to puncturing with low weight, the reinforcement layer contains multifilament threads of more than 30 polyester/polyarylate filaments, and the filaments are spun from molten liquid-crystal polymer.

12 Claims, 1 Drawing Sheet

(56) References Cited

U.S. PATENT DOCUMENTS

| | | | |
|---|---|---|---|
| 2002/0104576 A1 | 8/2002 | Howland |
| 2002/0106956 A1 | 8/2002 | Howland |
| 2002/0111099 A1 | 8/2002 | Howland |
| 2002/0124904 A1 | 9/2002 | Howland et al. |
| 2007/0068614 A1 | 3/2007 | Klapp et al. |

FOREIGN PATENT DOCUMENTS

| | | |
|---|---|---|
| DE | 19909648 | 11/2000 |
| EP | 1010554 | 6/2000 |
| JP | 60-28528 | 2/1985 |
| JP | 01-060402 | 3/1989 |
| WO | 02/18158 | 3/2002 |

OTHER PUBLICATIONS

Vectran—Liquid Crystal Polymer Fiber, Brochure, 1990.

Vectran—Grasp the World of Tomorrow, Liquid Crystal Technology, 1997.

Vectran—Grasp the World of Tomorrow, Liquid Crystal Technology, 1999.

Vectran—Grasp the World of Tomorrow, Liquid Crystal Technology, 2002.

Auto Mechanics Fundamentals, Martin W. Stockel. The Goodheart-Willcos Company, Inc., South Holland, Illinois, 1974.

SpinSkins, Performance Tire Liners, Warwick Mills, Inc.

* cited by examiner

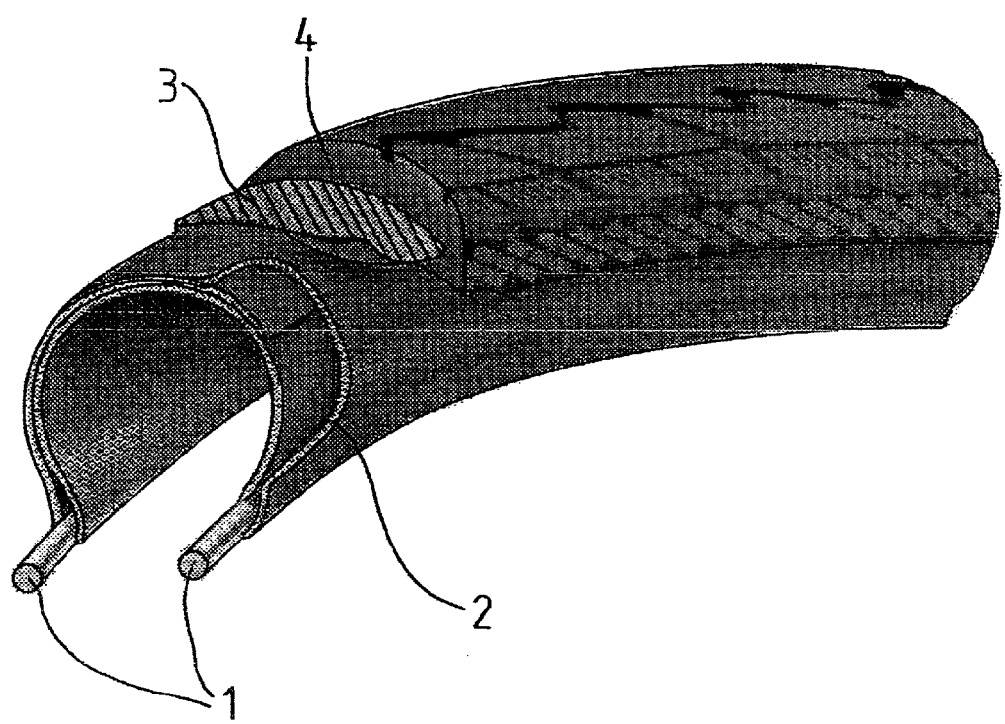

BICYCLE TIRE WITH REINFORCEMENT LAYER

This Application is a Continuation Application of U.S. patent application Ser. No. 10/576,601, filed on Sep. 24, 2004, which is a National Phase Application of International Application No PCT/EP2004/052301, filed Sep. 24, 2004 which claims priority to German Application No. 10349794.3 filed Oct. 24, 2003. The disclosure of application Ser. No. 10/576,601 is incorporated by reference herein in its entirety.

FIELD OF THE INVENTION

The invention relates to bicycle tires with at least one reinforcement layer that contains strength supports and that is arranged between carcass and tread rubber and/or between the carcass layers below the tread rubber and/or within the tread rubber.

BACKGROUND INFORMATION

Bicycle tires Including at least one reinforcement layer that contains strength supports and that is arranged between a carcass and a tread rubber and/or between the carcass layers below the tread rubber and/or within the tread rubber are known, e.g., from German utility model DE 77 17 997 U1 and DE 199 09 648 A1. The strength supports in these cited documents are composed of aramid (aromatic polyamide). The reinforcement layers are thereby used as puncture protection. They are to protect the tube from perforations by sharp objects, such as, e.g., shards or granulate, and damage. It is also known to embody puncture protection layers of polyamide, polyester or special rubber layers.

However, the known puncture protection layers entail a high weight to ensure a particularly high resistance to puncturing, since several layers, thicker fabric or thicker threads are used for a high resistance to puncturing. The high weight has an adverse effect on rolling resistance.

Automobile tires are known from U.S. Pat. No. 5,427,165 which have strength supports in the belt with a (1+6) construction of seven monofilaments. The monofilaments have diameters from 40 to 400 μm and comprise a liquid-crystal polymer, such as, e.g., Vectra® from Hoechst Celanese. Completely different demands are made on belts for automobile tires with regard to the desired properties than on reinforcement layers for bicycle tires. The belt with automobile tires in radial construction is thus used in particular for dimensional and driving stability, which is achieved through high torsional stiffness and bending stiffness.

SUMMARY OF THE INVENTION

The object of the invention is to provide a bicycle tire that has a high resistance to puncturing with low weight.

The object is attained in that the reinforcement layer contains multifilament threads of more than 30 polyester/polyarylate filaments, whereby the filaments are spun from molten liquid-crystal polymer.

BRIEF DESCRIPTION OF THE DRAWINGS

Other characteristics and advantages of the invention will be better understood from the detailed description that follows, with reference to the annexed drawings, in which:

FIG. 1 is a section through a bicycle tire according to the invention.

DETAILED DESCRIPTION

Surprisingly, with bicycle tires with these multifilament threads in the reinforcement layer, a much higher resistance to perforation can be obtained than with other threads with the same or similar layer construction (same thread count, same number of layers). A high resistance to perforation can also be achieved if there is a lower thread count of the thread within a reinforcement layer than is conventional or if fewer reinforcement layers, e.g., only one reinforcement layer, are used. This has the advantage that, even with high resistance to puncturing, the bicycle tire still has a low weight and thus a lower rolling resistance. In addition, multifilament threads with more than 30 filaments provide a high fatigue resistance.

According to an advantageous further development of the invention, the polyester/polyarylate filaments have a diameter of less than 40 μm. By using such thin filaments, a good dynamic durability and a large surface of the strength support is achieved, whereby the latter contributes to a good adhesion to the surrounding rubber compound.

The polyester/polyarylate preferably has the following structure:

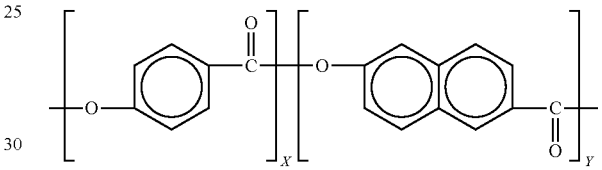

For example, multifilament threads of the Vectran® type from Celanese AG can be used. Particularly high resistances to perforation can be achieved with threads of this polymer.

The special multifilament threads in the reinforcement layer can be present as threads running parallel to one another and not intersecting—as a so-called cord fabric layer—with a thread count of 130 to 480 threads per 10 cm, preferably 200 to 300 threads per 10 cm. In this type of cord fabric as a rule the parallel threads are held together by very thin weft threads, e.g., of cotton, during processing. These cord fabric layers can be processed very easily and provide a good puncture protection with the given thread counts. The cord fabric layer can contain only the multifilament threads of polyester/polyarylate filaments as parallel threads. However, it is also possible for threads of a different material to be present at the same time parallel in the cord fabric layer.

It has proven advantageous with the cord fabric layers with thread counts of 130 to 480 threads per 10 cm if the fineness of the threads is 200 to 950 dtex, preferably 350 to 600 dtex, whereby with a higher thread count, threads with lower fineness can be used, and with lower thread count, threads with great fineness, in order to ensure a good resistance to perforation.

The threads within a cord fabric layer are preferably arranged at an angle of 40 to 50° to the tire circumferential direction and crosswise to the strength supports of the fabric layer beneath, e.g., the carcass layer. In this manner an additional reinforcing effect is achieved.

Alternatively to the cord fabric layer, the multifilament threads of polyester/polyarylate filaments can also be present in a fabric within a reinforcement layer, whereby the fabric is embodied to be stretchable in the tire circumferential direction in order to make it possible to raise the green tire in the tire mold. With the fabric it is immaterial whether all the warp and weft threads are made of the multifilament thread or whether threads of other material are also present. As fabric, a woven band is preferably used with warp threads of stretchable material, e.g., polyamide or polyester thread, in the tire circumferential direction and with weft threads of the multifilament thread, which ensures a good manufacturability of the tire with high puncture protection. Moreover, this type of fabric is more cost-effective than a fabric that is composed of only the special multifilament threads.

The bicycle tire can have only one reinforcement layer. However, the arrangement of several reinforcement layers according to the invention guarantees particularly high resistance to puncturing.

The bicycle tire according to the invention can be produced according to conventional methods that are known for the construction of bicycle tires, whereby the reinforcement layers according to the invention are applied to the carcass, e.g., as rubberized cord fabric or fabric layers. Before the coating with the rubber compound, the multifilament threads of polyester/polyarylate filaments can be provided with adhesion-promoting substances for better adhesion between rubber and thread.

EXAMPLES

The invention is explained in more detail below on the basis of an exemplary embodiment in conjunction with the following FIGURE, but without being restricted to this example.

The only FIGURE shows in diagrammatic form the section through a bicycle tire according to the invention.

The bicycle tire has bead cores 1, a carcass 2, which is wrapped around the bead cores 1 and overlaps under the tread rubber 4, a reinforcement layer 3 and a tread rubber 4.

A tubeless bicycle sport tire (width 23 mm) according to the FIGURE was produced with a reinforcement layer 3 of a cord fabric with multifilament threads each of 80 polyester/polyarylate filaments with a filament diameter of 23 μm (Vectran® HS, Celanese AG). The threads had a fineness of 444 dtex. The thread count was 240 threads per 10 cm. The fabric was cut diagonally and was applied at an angle of 45° to the tire circumferential direction. The tire was tested with respect to its resistance to perforation, its weight, its rolling resistance and its continuous loaded operation according to the following test descriptions:

Resistance to perforation: The tire is mounted on a rim with associated tube and acted on with the air pressure according to use for an adult's bicycle for 65 kg. Then a dry stylus is applied in the tread groove base at the zenith of the tire and moved forwards with a push until puncture. The force until puncture is determined.

Rolling resistance: Measurement on smooth drum test bed at 50 daN load at a speed of 30 km/h. The rolling resistance force is measured and the rolling resistance coefficient is determined as a %.

Continuous loaded operation: Measurement on drum test bed with a smooth drum at 65 daN load and a speed of 50 km/h. The kilometers covered until air loss are measured.

As a comparison, a bicycle tire was produced that, instead of the single reinforcement layer of the multifilament threads each of 80 polyester/polyarylate filaments, had two reinforcement layers of cord fabric layers of nylon thread (polyamide thread) lying crosswise with a fineness of 470 dtex. The fabric was cut diagonally and was applied intersecting at an angle of 45° to the tire circumferential direction. The thread count was likewise 240 threads per 10 cm. This tire was also tested with respect to resistance to perforation, weight, rolling resistance and continuous loaded operation.

The results of the tests are shown in table 1.

TABLE 1

|  | Tire according to the invention | Tire with nylon layers |
| --- | --- | --- |
| Resistance to perforation (daN) | 70.6 | 62.7 |
| Weight (g) | 213 | 220 |
| Rolling resistance coefficient at 8.5 bar (%) | 0.52 | 0.57 |
| Continuous loaded operation (km) | >10700 | >10900 |

Table 1 shows that the tire according to the invention has a higher resistance to perforation despite single-layer reinforcement. A lower rolling resistance results from the reduced weight. The performance in continuous loaded operation is at the same level as for the tire with nylon layers. The tests for continuous loaded operation were abandoned without defect after the kilometer performances given in table 1.

The invention claimed is:

1. Bicycle tire comprising:
a carcass;
a tread rubber;
one reinforcement layer in the tire, the one reinforcement layer containing strength supports comprising multifilament threads of more than 30 polyester/polyarylate filaments and having a fineness of 200 to 950 dtex, the filaments being spun from molten liquid-crystal polymer, arranged between the carcass and the tread rubber and/or between carcass layers below the tread rubber and/or within the tread rubber, the polyester/polyarylate filaments having a diameter of less than 40 μm; and
the multifilament threads being present in the one reinforcement layer as threads running parallel to one another and not intersecting with a thread count of 130 to 480 threads per 10 cm.

2. Bicycle tire according to claim 1, wherein the polyester/polyarylate has the following structure:

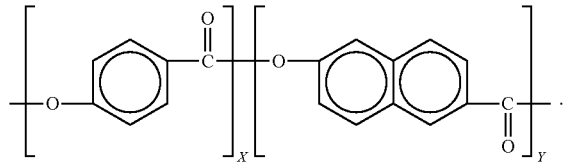

3. Bicycle tire according to claim 1, wherein the multifilament threads are present in the reinforcement layer as threads running parallel to one another and not intersecting, with a thread count of 200 to 300 threads per 10 cm.

4. Bicycle tire according to claim 3, wherein the multifilament threads have a fineness of 350 to 600 dtex.

5. Bicycle tire according to claim 1, wherein the multifilament threads are arranged at an angle of 40 to 50° to the tire circumferential direction and crosswise to the strength supports of the fabric layer beneath.

6. Bicycle tire according to claim 1, wherein the multifilament threads are arranged at an angle of 40 to 50° to the tire circumferential direction and crosswise to the multifilament threads of a fabric layer beneath.

7. Bicycle tire according to claim 6, wherein the multifilament threads are present in the reinforcement layer as threads running parallel to one another and not intersecting, with a thread count of 200 to 300 threads per 10 cm.

8. Bicycle tire according to claim 7, wherein the multifilament threads in the reinforcement layer are present in a fabric, and the fabric is stretchable in the tire circumferential direction.

9. Bicycle tire according to claim 8, wherein the fabric is a woven band with warp threads of stretchable material in the tire circumferential direction and with weft threads of the multifilament thread.

10. Bicycle tire according to claim 6, wherein the multifilament threads in the reinforcement layer are present in a fabric, and the fabric is stretchable in the tire circumferential direction.

11. Bicycle tire according to claim 10, wherein the fabric is a woven band with warp threads of stretchable material in the tire circumferential direction and with weft threads of the multifilament thread.

12. Bicycle tire according to claim 1, wherein the multifilament threads have a fineness of 350 to 600 dtex.

* * * * *

(12) EX PARTE REEXAMINATION CERTIFICATE (10899th)
United States Patent
Klapp et al.

(10) Number: US 9,016,341 C1
(45) Certificate Issued: Jun. 24, 2016

(54) BICYCLE TIRE WITH REINFORCEMENT LAYER

(75) Inventors: Wolfgang Klapp, Korbach (DE); Wolfgang Bende, Allendorf (DE)

(73) Assignee: CONTINENTAL REIFEN DEUTSCHLAND GMBH, Hannover (DE)

Reexamination Request:
No. 90/013,559, Aug. 6, 2015

Reexamination Certificate for:
Patent No.: 9,016,341
Issued: Apr. 28, 2015
Appl. No.: 12/829,865
Filed: Jul. 2, 2010

Related U.S. Application Data

(63) Continuation of application No. 10/576,601, filed as application No. PCT/EP2004/052301 on Sep. 24, 2004, now abandoned.

(30) Foreign Application Priority Data

Oct. 24, 2003 (DE) .................................. 10 349 794

(51) Int. Cl.
| | |
|---|---|
| *B60C 9/10* | (2006.01) |
| *D02G 3/48* | (2006.01) |
| *B60C 9/00* | (2006.01) |
| *B60C 9/20* | (2006.01) |
| *B60C 19/12* | (2006.01) |

(52) U.S. Cl.
CPC ................. *B60C 9/0042* (2013.04); *B60C 9/20* (2013.01); *B60C 19/12* (2013.01); *B60C 2200/12* (2013.04); *Y10T 152/1081* (2015.01); *Y10T 152/10495* (2015.01); *Y10T 152/10765* (2015.01)

(58) Field of Classification Search
None
See application file for complete search history.

(56) References Cited

To view the complete listing of prior art documents cited during the proceeding for Reexamination Control Number 90/013,559, please refer to the USPTO's public Patent Application Information Retrieval (PAIR) system under the Display References tab.

*Primary Examiner* — Timothy J. Kugel

(57) ABSTRACT

Bicycle tires with at least one reinforcement layer that contains strength supports and that is arranged between carcass and tread rubber and/or between carcass layers below the tread rubber and/or within the tread rubber. For a high resistance to puncturing with low weight, the reinforcement layer contains multifilament threads of more than 30 polyester/polyarylate filaments, and the filaments are spun from molten liquid-crystal polymer.

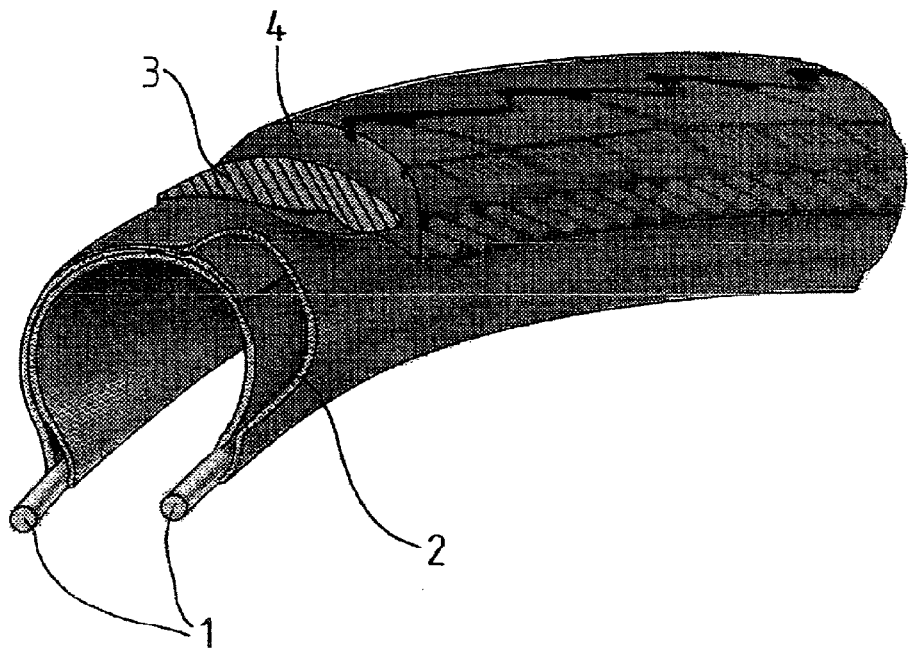

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-4 and 7-12 is confirmed.

Claims 5 and 6 are determined to be patentable as amended.

5. Bicycle tire according to claim 1, wherein the multifilament threads are arranged at an angle of 40 to 50° to the tire circumferential direction and crosswise to the strength supports of [the] *a* fabric layer beneath *comprising a carcass layer*.

6. Bicycle tire according to claim 1, wherein the multifilament threads are arranged at an angle of 40 to 50° to the tire circumferential direction and crosswise to [the] multifilament threads of a fabric layer beneath *comprising a carcass layer*.

\* \* \* \* \*